(12) United States Patent
Do et al.

(10) Patent No.: US 8,692,964 B2
(45) Date of Patent: Apr. 8, 2014

(54) LIQUID CRYSTAL DISPLAY AND METHOD FOR MANUFACTURING THE SAME

(75) Inventors: Hee-Wook Do, Cheonan-si (KR); Ki-Chul Shin, Seongnam-si (KR); Sung-Min Kang, Seoul (KR); Seung-Hee Lee, Seoul (KR); Ji-Hoon Kim, Gimpo-si (KR)

(73) Assignee: Samsung Display Co., Ltd., Yongin (KR)

( * ) Notice: Subject to any disclaimer, the term of this patent is extended or adjusted under 35 U.S.C. 154(b) by 615 days.

(21) Appl. No.: 12/492,943

(22) Filed: Jun. 26, 2009

(65) Prior Publication Data

US 2010/0053521 A1 Mar. 4, 2010

(30) Foreign Application Priority Data

Aug. 26, 2008 (KR) ........................ 10-2008-0083301

(51) Int. Cl.
*G02F 1/1335* (2006.01)

(52) U.S. Cl.
USPC ............................ 349/119; 349/117; 349/118

(58) Field of Classification Search
USPC .......................................................... 349/118
See application file for complete search history.

(56) References Cited

U.S. PATENT DOCUMENTS

| | | |
|---|---|---|
| 2005/0219447 A1 | 10/2005 | Slaney |
| 2005/0270459 A1 | 12/2005 | Elman |
| 2007/0263152 A1* | 11/2007 | Mazaki et al. ................ 349/130 |
| 2007/0273816 A1 | 11/2007 | Kitagawa et al. |
| 2008/0111960 A1* | 5/2008 | Yoshida et al. ............... 349/117 |
| 2009/0153782 A1 | 6/2009 | Fukagawa et al. |
| 2009/0207355 A1 | 8/2009 | Yanai et al. |

FOREIGN PATENT DOCUMENTS

| | | |
|---|---|---|
| CN | 1841146 | 10/2006 |
| CN | 1860404 | 11/2006 |
| CN | 101078839 | 11/2007 |
| CN | 101086586 | 12/2007 |
| CN | 100410760 | 8/2008 |
| EP | 0412844 | 6/1996 |
| JP | 2006-184302 | 7/2006 |
| JP | 2007-156433 | 6/2007 |
| JP | 2007-206112 | 8/2007 |
| JP | 2007-304155 | 11/2007 |
| JP | 2008-052147 | 3/2008 |
| JP | 2008-064817 | 3/2008 |
| KR | 100462327 | 12/2004 |
| KR | 1020060134476 | 12/2006 |
| KR | 1020070092744 | 9/2007 |
| KR | 1020080020628 | 3/2008 |
| TW | 502127 | 9/2002 |
| WO | 2006/052108 | 5/2006 |
| WO | 2006/132404 | 12/2006 |

OTHER PUBLICATIONS

European Search Report dated Nov. 23, 2011 issued for European Patent Application No. 09008718.0.

* cited by examiner

*Primary Examiner* — Wen-Ying P Chen

(74) *Attorney, Agent, or Firm* — H.C. Park & Associates, PLC

(57) ABSTRACT

The present invention relates to compensation films of a vertically-aligned liquid crystal display. Upper and lower compensation films asymmetrically differ in refractive index from each other.

30 Claims, 13 Drawing Sheets

FIG.12

| | Upper film | | | Lower film | | | Total distance |
|---|---|---|---|---|---|---|---|
| | R0(nm) | Rth(nm) | Nz | R0(nm) | Rth(nm) | Nz | |
| Example 1 | 103 | 82 | 1.3 | 32 | 153 | 5.3 | 0.47189 |
| | | | | 28 | 153 | 6.05 | 0.42811 |
| | | | | 23 | 153 | 7.04 | 0.38786 |
| | | | | 20 | 153 | 8.04 | 0.36005 |
| | | | | 18 | 153 | 9.03 | 0.34032 |
| | | | | 16 | 153 | 9.91 | 0.32681 |
| | | | | 15 | 153 | 10.97 | 0.31573 |
| | | | | 13 | 153 | 12 | 0.31786 |
| | | | | 12 | 153 | 13.24 | 0.31986 |
| | | | | 10 | 153 | 14.77 | 0.32254 |
| Example 2 | 94 | 94 | 1.5 | 30 | 142 | 5.3 | 0.43059 |
| | | | | 26 | 142 | 6.05 | 0.39529 |
| | | | | 22 | 142 | 7.04 | 0.36304 |
| | | | | 19 | 142 | 8.04 | 0.34119 |
| | | | | 17 | 142 | 9.03 | 0.32651 |
| | | | | 15 | 142 | 9.91 | 0.32036 |
| | | | | 14 | 142 | 10.97 | 0.32400 |
| | | | | 12 | 142 | 12 | 0.32632 |
| | | | | 11 | 142 | 13.24 | 0.32906 |
| | | | | 10 | 142 | 14.77 | 0.33479 |
| Example 3 | 88 | 110 | 1.76 | 28 | 132 | 5.3 | 0.40282 |
| | | | | 24 | 132 | 6.05 | 0.37317 |
| | | | | 20 | 132 | 7.04 | 0.34837 |
| | | | | 18 | 132 | 8.04 | 0.33037 |
| | | | | 15 | 132 | 9.03 | 0.32044 |
| | | | | 14 | 132 | 9.91 | 0.32146 |
| | | | | 13 | 132 | 10.97 | 0.32378 |
| | | | | 11 | 132 | 12 | 0.32606 |
| | | | | 10 | 132 | 13.24 | 0.32861 |
| | | | | 9 | 132 | 14.77 | 0.33141 |
| Comparative Example | 53 | 114 | 2.67 | 53 | 114 | 2.67 | 0.36504 | ial
LIQUID CRYSTAL DISPLAY AND METHOD FOR MANUFACTURING THE SAME

CROSS-REFERENCE TO RELATED APPLICATION

This application claims priority from and the benefit of Korean Patent Application No. 10-2008-0083301, filed on Aug. 26, 2008, which is hereby incorporated herein by reference for all purposes as if fully set forth herein.

BACKGROUND OF THE INVENTION

1. Field of the Invention

The present invention relates to a vertical alignment liquid crystal display with compensation films, and a method for manufacturing the same.

2. Discussion of the Background

Liquid crystal displays are now widely used flat panel displays. A liquid crystal display has two display panels on which field generating electrodes such as pixel electrodes and a common electrode are formed, and a liquid crystal layer is disposed between the panels. In the liquid crystal display, voltages are applied to the field generating electrodes to generate an electric field in the liquid crystal layer. The alignment of liquid crystal molecules of the liquid crystal layer is determined by the electric field. Accordingly, the polarization of incident light may be controlled to display images.

Depending upon the light source used, a liquid crystal display may be classified as a backlit liquid crystal display in which images are displayed using a lighting unit placed at the back of a liquid crystal cell, a reflective liquid crystal display in which the images are displayed using external natural light, or a transflective liquid crystal display in which the structures of a backlit liquid crystal display and a reflective liquid crystal display are combined. A transflective liquid crystal display may be operated in a room or a dark place with no external light source in a transmission mode in which the image display is performed using a built-in light source of the display device, and may be operated in an outdoor high illumination environment in a reflective mode in which the image display is performed by reflecting external light.

A liquid crystal display may operate in a vertical alignment mode, a twisted nematic mode, or an electrically controlled birefringence mode depending upon the characteristics of the liquid crystal used.

A vertical alignment mode liquid crystal display may be advantageous in that the viewing angle may be sufficiently wide to allow the screen images to be recognized from the lateral side without any gray inversion. However, color shifting may be generated at the lateral side such that light leakage may occur and the contrast ratio may be reduced.

SUMMARY OF THE INVENTION

The present invention provides a vertical alignment liquid crystal display with compensation films having differing refractive indexes that may decrease color shifting and light leakage while enhancing the contrast ratio.

The present invention also provides a method of manufacturing the vertical alignment liquid crystal display.

Additional features of the invention will be set forth in the description which follows, and in part will be apparent from the description, or may be learned by practice of the invention.

The present invention discloses a liquid crystal display including a liquid crystal panel with a vertically aligned liquid crystal layer, a first compensation film attached to a thin film transistor side surface of a first substrate of the liquid crystal panel, a first polarizer attached to an outer surface of the first compensation film, a second compensation film attached to a surface of a second substrate facing the first substrate, and a second polarizer attached to an outer surface of the second compensation film. The first and second compensation films differ in thickness and in-plane phase retardation from each other.

The present invention also discloses a method for manufacturing a liquid crystal display including preparing a liquid crystal panel with a vertically-aligned liquid crystal display and attaching a first compensation film to a thin film transistor side surface of a first substrate of the liquid crystal panel. Thereafter, a first polarizer is attached to an outer surface of the first compensation film. A second compensation film is attached to a surface of a second substrate facing the first substrate, and a second polarizer is attached to an outer surface of the second compensation film. The first and second compensation films differ in thickness and in-plane phase retardation from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 12 shows retardations Ro and Rth, an Nz refractive index, and a total distance in examples and a comparative example.

DETAILED DESCRIPTION OF THE ILLUSTRATED EMBODIMENTS

Figure 1:
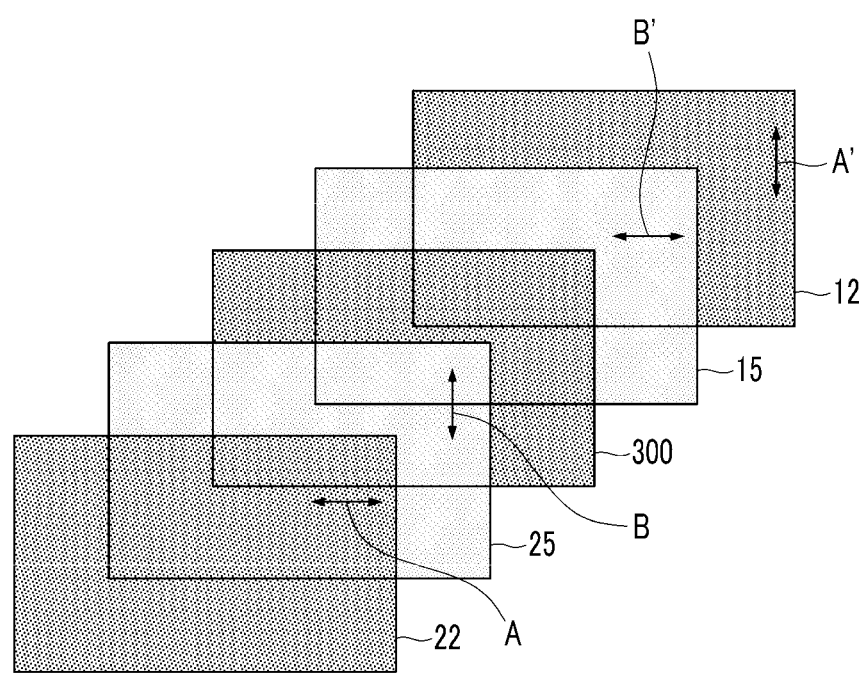
FIG. 1 shows the attachment relation of polarizers and compensation films in a liquid crystal display according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

A liquid crystal display according to an exemplary embodiment of the present invention will be described in detail with reference to FIG. 1.

FIG. 1 shows the attachment relation of polarizers and compensation films in a liquid crystal display according to an exemplary embodiment of the present invention.

As shown in FIG. 1, a liquid crystal display according to an exemplary embodiment of the present invention includes an upper polarizer 22, an upper compensation film 25, a liquid crystal panel 300, a lower compensation film 15, and a lower polarizer 12. The distinction between upper and lower sides is made such that the upper side corresponds to the side of light incidence, and the lower side to the side of light emission.

The liquid crystal panel 300 will first be described in detail.

The liquid crystal panel 300 includes an upper substrate (not shown), a lower substrate (not shown), and a vertically aligned liquid crystal layer (not shown) disposed between the upper and lower substrates.

Although the liquid crystal panel 300 may be structured in various different ways, a representative structure thereof is described below.

The lower substrate may include gate lines, data lines, and thin film transistors connected to the gate and data lines. The gate lines are connected to gate electrodes of the thin film transistors to transmit scanning signals to the thin film transistors. The data lines are connected to source electrodes of the thin film transistors to transmit data voltages to the thin film transistors. Drain electrodes of the thin film transistors are connected to pixel electrodes. The pixel electrodes control the direction of alignment of the liquid crystal display with a voltage charged due to the data voltage. Each pixel electrode may partition one pixel region into a plurality of domains by way of domain partitioning units such as openings or protrusions. The pixel electrode may be formed with two or more separated electrodes, which may be capacitor-combined with each other.

An alignment layer may be formed on the topmost layer of the lower substrate contacting the liquid crystal layer.

The upper substrate may be overlaid with a light blocking layer (not shown) having openings, and color filters (not shown) may be disposed in the openings of the light blocking layer. The light blocking layer prevents the leakage of light, and blocks the liquid crystal layer in areas where it is not aligned in the desired direction. The color filters make it possible to display colors by granting color sensations to the light, and may include three primary colors of red, green, and blue. A common electrode is formed on the color filters and the light blocking layer. The common electrode generates an electric field together with the pixel electrode of the lower substrate so as to control the liquid crystal layer. As with the pixel electrode, domain partitioning units such as openings or protrusions may be formed at the common electrode.

An alignment layer may be formed on the bottommost layer of the upper substrate contacting the liquid crystal layer.

Alternatively, the light blocking layer or the color filters may be formed on the lower substrate.

The compensation films 15 and 25 and polarizers 12 and 22 are attached to the outer surfaces of the liquid crystal panel 300.

The polarizers 12 and 22 have absorption axes A' and A, respectively, and transmission axes that are perpendicular to the absorption axes A' and A. The polarizers 12 and 22 absorb the light components polarized in the direction of the absorption axes A' and A, and transmit only the light components polarized in the direction of the transmission axes.

The compensation films 15 and 25 have refractive indices nx, ny, and nz in x, y, and z axis directions, respectively. The refractive indices of the compensation films 15 and 25 in the in-plane x and y axis directions may be greater than the refractive index in the z axis direction, which is perpendicular to the x and y axis directions. If the x axis direction is assumed to have the greatest refractive index in the compensation films 15 and 25, the formula nx>ny>nz is established. As the refractive index in the x axis direction has the greatest value, the light polarized in the x axis direction becomes the slowest, and hence the x axis direction will hereinafter be referred to as the "slow axis."

The slow axes of the compensation films 15 and 25 are indicated by B' and B, respectively, in FIG. 1. The absorption axis A of the upper polarizer 22 and the slow axis B of the upper compensation film 25 are perpendicular to each other, and the absorption axis A' of the lower polarizer 12 and the slow axis B' of the lower compensation film 15 are perpendicular to each other.

With an exemplary embodiment of the present invention, the upper compensation film 25 and the lower compensation film 15 may be differentiated from each other in at least one of the refractive indices nx, ny, and nz thereof in the x, y, and z axis directions. It is inconvenient to express the respective refractive indices in the three axial directions per the respective compensation films. For this reason, a representative refractive index (referred to hereinafter as "Nz refractive index") expressing all of the three-directional refractive indices nx, ny, and nz will be defined as below, and used.

$$Nz=(nx-nz)/(nx-ny) \quad \text{(Equation 1)}$$

With the use of the Nz refractive index, the upper and lower compensation films 25 and 15 according to an exemplary embodiment of the present invention may be differentiated from each other in the Nz refractive index thereof such that the Nz refractive index of the upper compensation film 25 is smaller than the Nz refractive index of the lower compensation film 15.

The liquid crystal display with the above-identified characteristics will be described in detail with reference to FIG. 2, FIG. 3, and FIG. 4.

Figure 2:
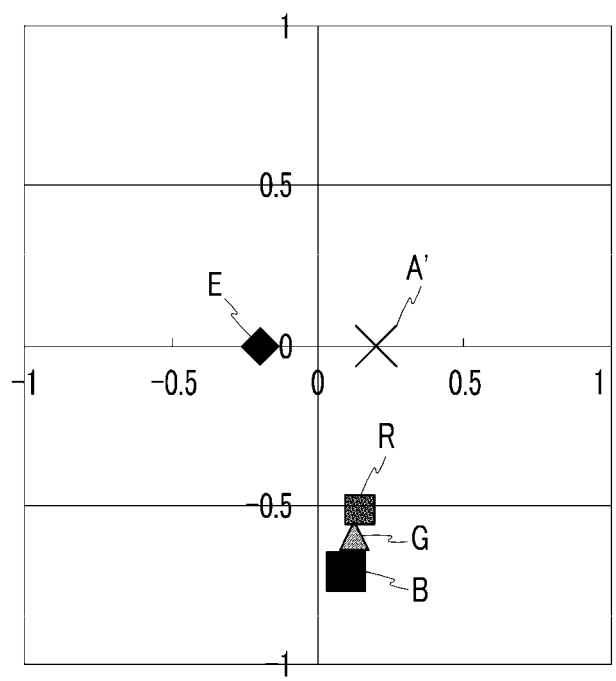
FIG. 2, FIG. 3, and FIG. 4 are Poincare coordinates showing the polarization state of light in a liquid crystal display shown in FIG. 1.
Figure 3:
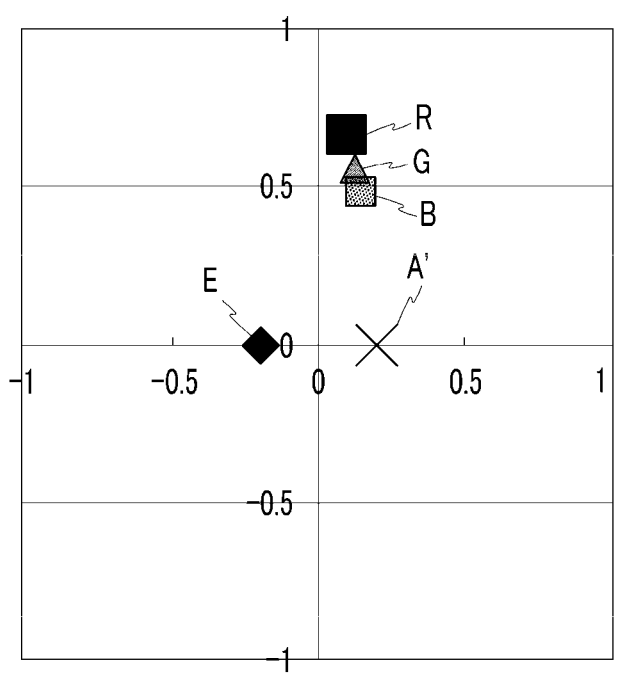
Figure 4:
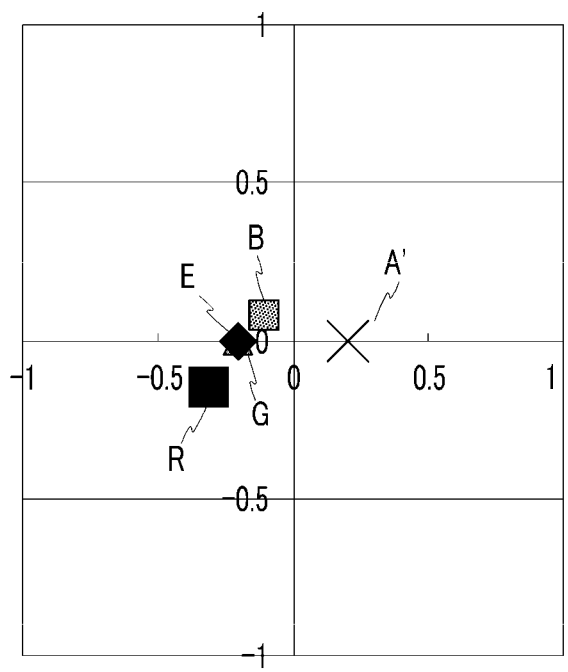

FIG. 2, FIG. 3, and FIG. 4 are Poincare coordinates showing the polarization state of light in a liquid crystal display shown in FIG. 1. With the exemplary embodiment shown in FIG. 2, FIG. 3, and FIG. 4, the in-plane phase retardation Ro of the upper compensation film 25 is 88 nm, the thickness direction phase retardation Rth is 110 nm, and the Nz refractive index is 1.76, while the in-plane phase retardation Ro of the lower compensation film 15 is 12 nm, the thickness direction phase retardation Rth is 130 nm, and the Nz refractive index is 10.97.

The in-plane phase retardation Ro and the thickness direction phase retardation Rth are determined by way of the following Equations 2 and 3, in which d indicates the thickness of the compensation film.

$$Ro=(nx-ny)*d \quad \text{(Equation 2)}$$

$$Rth=((nx+ny)/2-nz)*d \quad \text{(Equation 3)}$$

With the Poincare coordinate system, the polarization state of light is expressed by points on the coordinate. Referring to FIG. 2, FIG. 3, and FIG. 4, A' indicates the point expressing the polarization state of the light passing the lower polarizer 12, and E indicates the point expressing the polarization state of the absorption axis of the upper polarizer 22. As the E point corresponds to the absorption axis of the upper polarizer 22, light may not leak as it comes closer to the E point. Meanwhile, referring to FIG. 2, FIG. 3, and FIGS. 4, R, G, and B represent the polarization state of the respective colors. The degree of color shift is identified on the basis of the dispersion degree of the respective R, G, and B points. As the distance between the respective R, G, and B points is enlarged, the color shift increases.

FIG. 2 shows the polarization state of light after it passes the lower polarizer 12 and the lower compensation film 15. FIG. 3 shows the polarization state of light after it passes the liquid crystal layer, and FIG. 4 shows the polarization state of light just before the light passing the upper compensation film 25 is incident upon the upper polarizer 22.

FIG. 2 shows the polarization state of light that is varied as the rays of red, green, and blue having passed the lower polarizer 12 transmit through the lower compensation film 15. When the respective color rays pass the transmission axis of the lower polarizer 12, they involve the polarization state of A', and as they transmit through the lower compensation film 15, the polarization state thereof varies depending upon the wavelength of light, like that shown in FIG. 2.

FIG. 3 shows the polarization state varied as the rays of R, G, and B shown in FIG. 2 transmit through the liquid crystal layer. If no electric field is applied to the liquid crystal layer so that the liquid crystal layer is in a black display state (a vertically-aligned state), the in-plane phase retardation Ro of the liquid crystal layer is 0, and the thickness direction phase retardation Rth is 320 nm. When the thickness direction phase retardation Rth is determined, the thickness of the vertically-aligned liquid crystal layer may be controlled according to the refractive index characteristic of the liquid crystal used, and adapted to that thickness direction phase retardation Rth.

FIG. 3 shows the polarization state of light that is varied as the rays of R, G, and B pass the liquid crystal layer.

FIG. 4 shows the polarization state of light that is varied as the rays of R, G, and B shown in FIG. 3 transmit through the upper compensation film 25. When the respective R, G, and B rays are in the polarization state of E, all the light components are absorbed so that the black is displayed. However, as shown in FIG. 4, a slight distance is present at the coordinate between the polarization state of the respective color rays and the polarization state of the absorption axis so that the leakage of light occurs. When the distance between the E point and the respective color points of R, G, and B on the Poincare coordinate shown in FIG. 4 is measured, the distance to the R point is 0.12245, the distance to the G point is 0.00259, and the distance to the B point is 0.19509, while the sum of those distances is 0.32013. (The distance between the respective color points of R, G, and B and the E point will be hereinafter referred to as "unit color distance," and the sum of the respective unit color distances as "total distance.") As such a distance is a distance on the Poincare coordinate, no separate units thereof exist, and light leakage may occur in proportion to that distance. Furthermore, the degree of color shift is identified based on the dispersion degree of the R, G, and B coordinates.

A liquid crystal display according to another exemplary embodiment of the present invention will now be described in detail.

Figure 5:
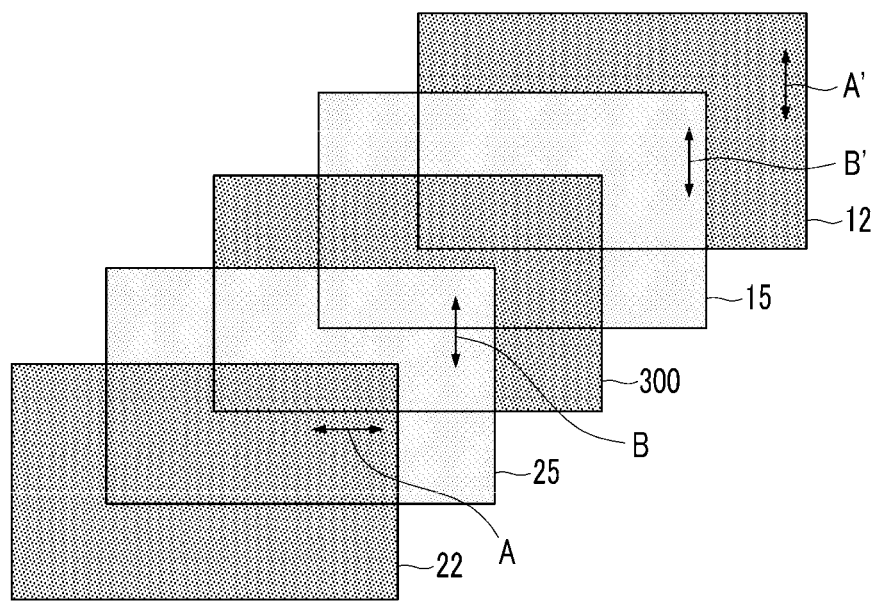
FIG. 5 shows the attachment relation of polarizers and compensation films in a liquid crystal display according to another exemplary embodiment of the present invention.

FIG. 5 shows the attachment relation of polarizers and compensation films in a liquid crystal display according to an exemplary embodiment of the present invention.

As shown in FIG. 5, a liquid crystal display according to an exemplary embodiment of the present invention includes an upper polarizer 22, an upper compensation film 25, a liquid crystal panel 300, a lower compensation film 15, and a lower polarizer 12. Differing from the exemplary embodiment shown in FIG. 1, the slow axis B' of the lower compensation film 15 is parallel to the absorption axis A' of the lower polarizer 12 in the exemplary embodiment shown in FIG. 5.

As with the liquid crystal panel 300 shown in FIG. 1, the liquid crystal panel 300 shown in FIG. 5 has a vertically-aligned liquid crystal layer, and may be structured in various different ways.

Compensation films 15 and 25 and polarizers 12 and 22 are attached to the outer surfaces of the liquid crystal panel 300.

The polarizers 12 and 22 have absorption axes A' and A, respectively, and transmission axes perpendicular to the absorption axes A' and A. The light component that is polarized in the absorption axis direction is absorbed, and only the light component that is polarized in the transmission axis direction perpendicular to the absorption axis direction is allowed to transmit therethrough.

The compensation films 15 and 25 have refractive indices nx, ny, and nz in the x, y, and z axis directions, respectively. With the compensation films 15 and 25, the refractive indices in the in-plane x and y axis directions are greater than the refractive index in the z axis direction vertical thereto. If the x axis direction is assumed to have the greatest refractive index in the compensation films 15 and 25, it is established that nx>ny>nz. As the refractive index in the x axis direction has the greatest value, the light that is polarized in the x axis direction is the slowest, and hence the x axis direction may be referred to as the slow axis. The slow axes of the compensation films 15 and 25 are indicated by B' and B in FIG. 5, respectively. The absorption axis A of the upper polarizer 22 and the slow axis B of the upper compensation film 25 are perpendicular to each other, and the absorption axis A' of the lower polarizer 12 and the slow axis B' of the lower compensation film 15 are parallel to each other.

With an exemplary embodiment of the present invention, the upper and lower compensation films 25 and 15 are differentiated from each other in at least one of the refractive indices nx, ny, and nz thereof in the x, y, and z axis directions. It is inconvenient to express the respective refractive indices for the three axes per the respective compensation films. For this reason, a representative refractive index (referred to hereinafter as "Nz refractive index") may be used to collectively express all the refractive indices nx, ny, and nz in the respective directions.

With the use of the Nz refractive index, the upper and lower compensation films 25 and 15 are differentiated from each other in the Nz refractive index thereof such that the Nz refractive index of the upper compensation film 25 is smaller than the Nz refractive index of the lower compensation film 15.

A liquid crystal display with the above-identified characteristics will be described in detail with reference to FIG. 6, FIG. 7, and FIG. 8.

Figure 6:
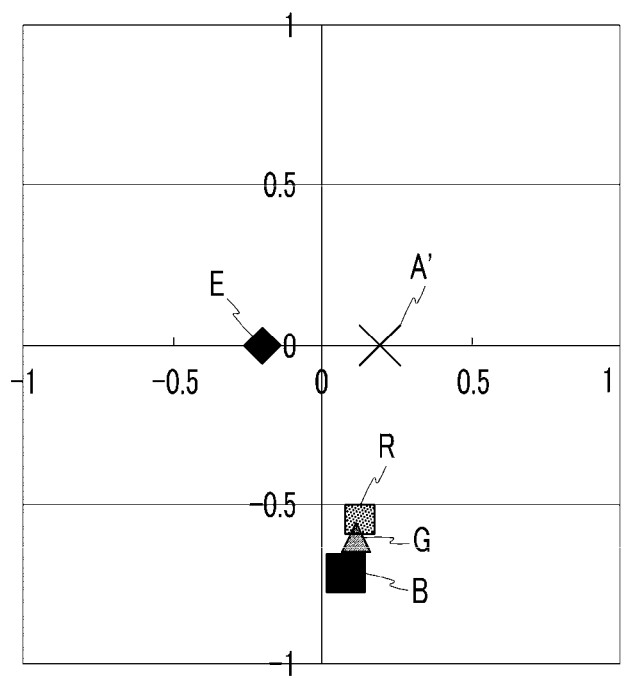
FIG. 6, FIG. 7, and FIG. 8 are Poincare coordinates showing the polarization state of light in a liquid crystal display shown in FIG. 5.
Figure 7:
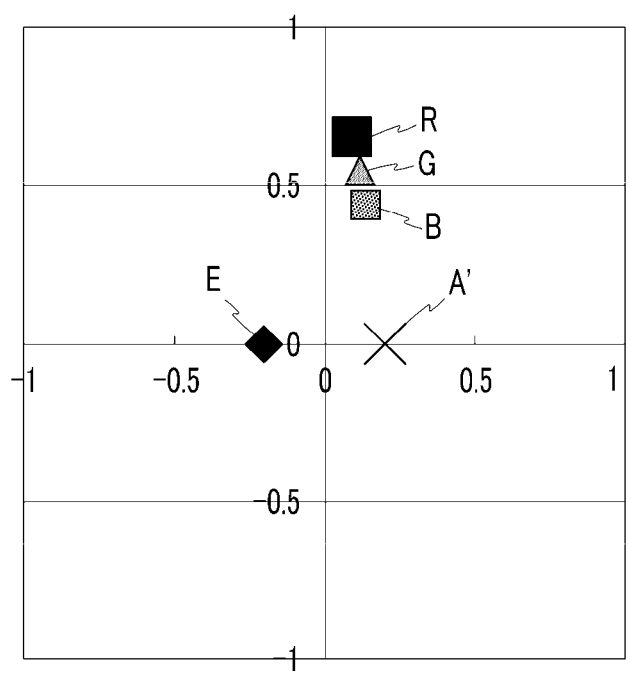
Figure 8:
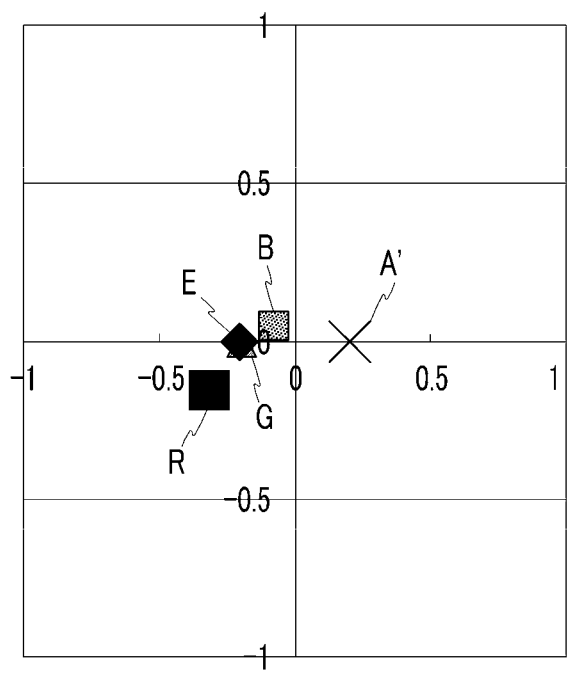

FIG. 6, FIG. 7, and FIG. 8 are Poincare coordinates showing the polarization state of light in a liquid crystal display according to an exemplary embodiment of the present invention. With the exemplary embodiment shown in FIG. 6, FIG. 7, and FIG. 8, the in-plane phase retardation Ro of the upper compensation film 25 is 86 nm, the thickness direction phase retardation Rth is 109 nm, and the Nz refractive index is 1.76, while the in-plane phase retardation Ro of the lower compensation film 15 is 15 nm, the thickness direction phase retardation Rth is 156 nm, and the Nz refractive index is 10.97. The in-plane phase retardation Ro, the thickness direction phase retardation Rth, and the Nz refractive index satisfy the above-described Equations 1, 2, and 3.

The Poincare coordinate system expresses the polarization state of light by way of the points on the coordinate. Referring to FIG. 6, FIG. 7, and FIG. 8, A' indicates the point expressing the polarization state of light as it passed the lower polarizer 12, and E indicates the point expressing the polarization state of the absorption axis of the upper polarizer 22. As the E point corresponds to the absorption axis of the upper polarizer 22, the leakage of light is not made as it comes closer to the E point. Meanwhile, referring to FIG. 6, FIG. 7, and FIGS. 8, R, G, and B show the polarization state of the respective colors. The degree of color shifting is identified depending upon the dispersion degree of the respective R, G, and B points. As the distance between the respective R, G, B points is enlarged, the color shifting may be increased.

FIG. 6 shows the polarization state of light after it has passed the lower polarizer 12 and the lower compensation film 15, FIG. 7 shows the polarization state of light after it has passed the liquid crystal layer, and FIG. 8 shows the polarization state of light just before the light having passed the upper compensation film 25 is incident upon the upper polarizer 22.

FIG. 6 shows the polarization state of light that is varied as the rays of red, green, and blue that have passed the lower polarizer 12 transmit through the lower compensation film 15. When the respective colors pass the transmission axis of the lower polarizer 12, they exhibit the polarization state of A'. As the light passes through the lower compensation film 15, the polarization state thereof is altered depending upon the wavelength of light, like that shown in FIG. 6.

FIG. 7 shows the polarization state of the rays of R, G, and B shown in FIG. 6, which are varied as they pass through the liquid crystal layer. When the liquid crystal layer is in a black display state (a vertically-aligned state) with no application of an electric field, the in-plane phase retardation Ro of the liquid crystal layer is 0, and the thickness direction phase retardation Rth is 320 nm. When the thickness direction phase retardation Rth is determined, the thickness of the vertically-aligned liquid crystal layer may be controlled according to the refractive index characteristic of the liquid crystal used, and may be adapted according to the thickness direction phase retardation Rth.

When the rays of R, G, and B pass the liquid crystal layer, the polarization state thereof is altered as shown in FIG. 7.

FIG. 8 shows the polarization state of the rays of R, G, and B shown in FIG. 7, which are varied as they transmit through the upper compensation film 25. When the respective R, G, and B rays have the polarization state of E, they are all absorbed, thereby displaying the black. However, as shown in FIG. 8, a slight distance is present at the coordinate between the polarization state of the color rays and the polarization state of the absorption axis, and the light is leaked. If the unit color distance between the E point and the respective R, G, and B points on the Poincare coordinate shown in FIG. 8 is measured, it is 0.13204 for R, 0.00364 for G, and 0.19433 for B, while the total distance being the sum thereof is 0.33001. As such a distance is that on the Poincare coordinate, separate units thereof do not exist, and the leakage of light occurs in proportion to the distance value. Furthermore, the degree of color shifting may be identified by way of the dispersion degree of the R, G, and B coordinates.

As described above, the Poincare coordinates are based on the exemplary embodiment of the present invention shown in FIG. 1 and FIG. 5. Compared with the Poincare coordinates shown in FIG. 2, FIG. 3, and FIG. 4 and FIG. 6, FIG. 7, and FIG. 8, the Poincare coordinates related to a conventional symmetrical liquid crystal display will now be described.

Figure 9:
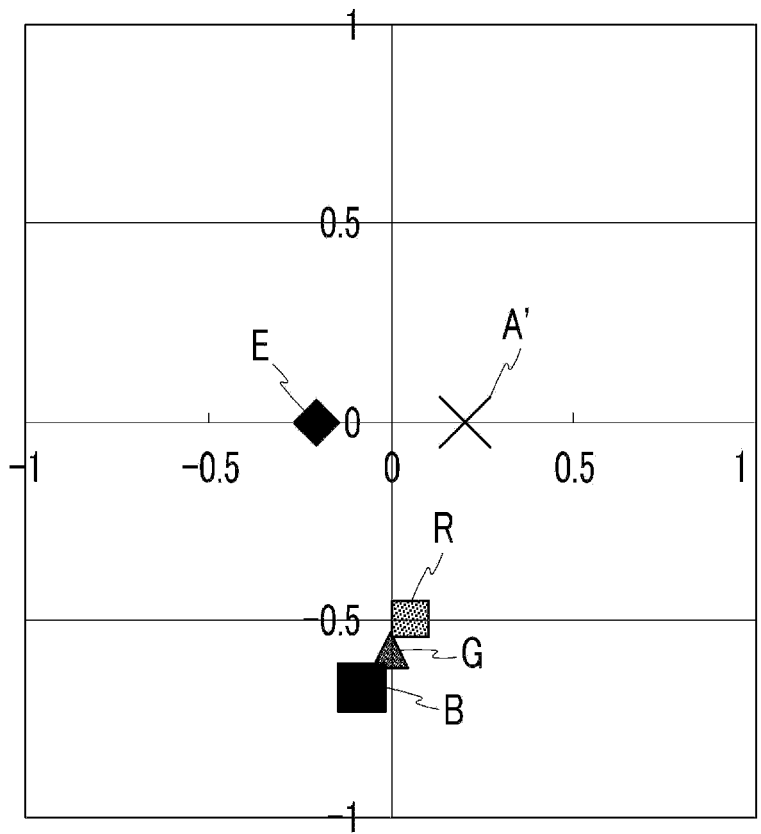
FIG. 9, FIG. 10, and FIG. 11 are Poincare coordinates showing the polarization state of light in a conventional liquid crystal display.
Figure 10:
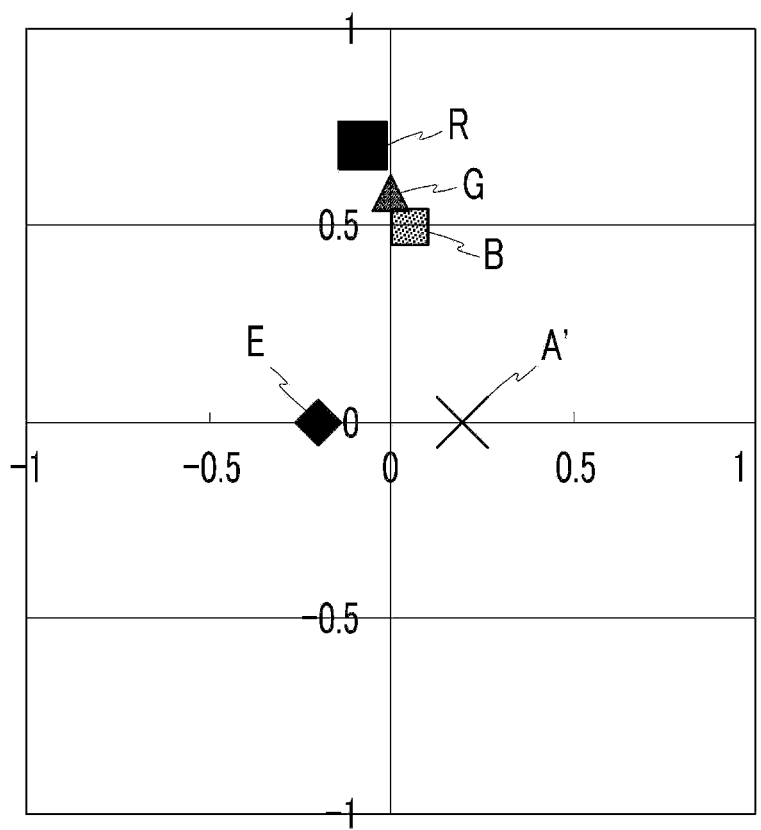
Figure 11:
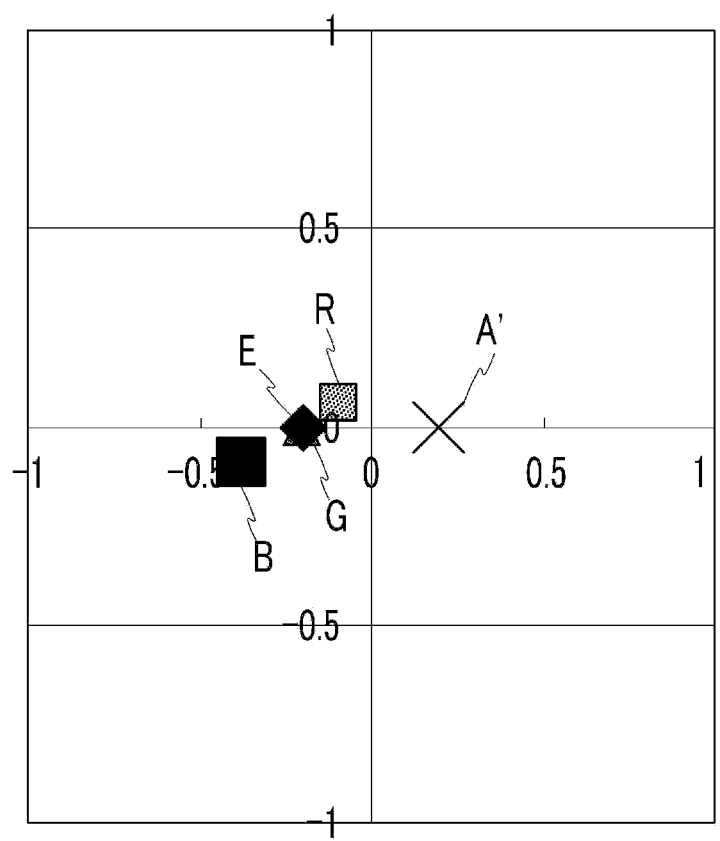

FIG. 9, FIG. 10, and FIG. 11 are Poincare coordinates showing the polarization state of light in a conventional symmetrical liquid crystal display.

With the conventional symmetrical liquid crystal display, the upper compensation film 25 and the lower compensation film 15 have the same Nz value.

FIG. 9, FIG. 10, and FIG. 1 show the measurement results related to the conventional liquid crystal display on condition that the in-plane phase retardation Ro of the upper and lower compensation films is 53 nm, the thickness direction phase retardation Rth is 114 nm, and the Nz refractive index is 2.67.

Referring to FIG. 9, FIG. 10, and FIG. 1, A' indicates the point expressing the polarization state of light as it passes the lower polarizer 12, and E indicates the point expressing the polarization state of the absorption axis of the upper polarizer 22. As the E point corresponds to the absorption axis of the upper polarizer 22, light leakage may not occur as it comes closer to the E point. Meanwhile, referring to FIG. 9, FIG. 10, and FIGS. 1, R, G, and B represent the polarization state of the respective colors. The degree of color shift is identified depending upon the dispersion degree of the respective R, G, and B points. As the distance between the respective R, G, and B points is enlarged, color shifting may be increased.

FIG. 9 shows the polarization state of light after it has passed the lower polarizer 12 and the lower compensation film 15, and FIG. 10 shows the polarization state of light after it has passed the liquid crystal layer. FIG. 1 shows the polarization state of light just before the light having passed the upper compensation film 25 is incident upon the upper polarizer 22.

FIG. 9 shows the polarization state of light that is varied as the rays of red, green, and blue having passed the lower polarizer 12 transmit through the lower compensation film 15. The respective colors that have passed the transmission axis of the lower polarizer 12 exhibit the polarization state of A', and as they transmit through the lower compensation film 15, the polarization state thereof is altered depending upon the wavelength of light, like that shown in FIG. 9.

FIG. 10 shows the polarization state of light that is varied as the rays of R, G, and B shown in FIG. 9 transmit through the liquid crystal layer. When the liquid crystal layer is in a black display state with no application of an electric field, the in-plane phase retardation Ro of the liquid crystal layer is 0, and the thickness direction phase retardation Rth is 320 nm. With the determination of the thickness direction phase retardation Rth, the thickness of the vertically-aligned liquid crystal layer may be controlled according to the refractive index characteristic of the liquid crystal used, and adapted according to the thickness direction phase retardation Rth.

When the rays of R, G, and B pass the liquid crystal layer, the polarization state thereof is altered like that shown in FIG. 7.

FIG. 11 shows the polarization state of light varied as the R, G, and B rays shown in FIG. 10 transmit through the upper compensation film 25. When the respective R, G, and B rays have the polarization state of E, all the light components are absorbed, thereby displaying the black. However, as shown in FIG. 11, a slight distance is present at the coordinate between the polarization state of the color rays and the polarization state of the absorption axis, and the light is leaked. When the unit color distance between the E point and the respective R, G, and B points is measured on the Poincare coordinate shown in FIG. 11, it is 0.12250 for R, 0.00874 for G, and 0.23380 for B, while the total distance, i.e. the sum thereof, is 0.36504. Such a distance is a distance on the Poincare coordinate, no separate units thereof exist, and light leakage may occur in proportion to the distance value. Furthermore, the degree of color shifting is identified the dispersion degree of the R, G, and B coordinates.

Table 1 collectively lists the refractive index of the compensation films shown in FIG. 4, FIG. 8, and FIG. 11, and the distance to the E point.

TABLE 1

| Kind | Exemplary embodiment of FIG. 1 | Exemplary embodiment of FIG. 5 | Conventional display device |
|---|---|---|---|
| Upper compensation film Ro (nm) | 88 | 86 | 53 |
| Upper compensation film Rth (nm) | 110 | 109 | 114 |
| Upper compensation film Nz | 1.76 | 1.76 | 2.67 |
| Lower compensation film Ro (nm) | 12 | 15 | 53 |
| Lower compensation film Rth (nm) | 130 | 156 | 114 |
| Lower compensation film Nz | 10.97 | 10.97 | 2.67 |
| Unit color distance of R | 0.12245 | 0.13204 | 0.12250 |
| Unit color distance of G | 0.00259 | 0.00364 | 0.00874 |
| Unit color distance of B | 0.19509 | 0.19433 | 0.23380 |
| Total distance | 0.32013 | 0.33001 | 0.36504 |

It can be clearly identified from Table 1 that the exemplary embodiments of the present invention shown in FIG. 1 and FIG. 5 differ from the conventional one.

With the exemplary embodiments shown in FIG. 1 and FIG. 5, the unit color distance between the respective R, G, and B points and the E point is relatively short as compared with that in the conventional display device. The unit color distance of R in the exemplary embodiment of FIG. 5 is slightly larger than that in the conventional liquid crystal display so as to induce the leakage of light, but the unit color distance of G and B may be reduced so as to decrease the total amount of light leakage. That is, the upper and lower compensation films differ in Nz refractive index from each other such that the Nz refractive index of the upper compensation film 25 may be smaller than that of the lower compensation film 15, thereby decreasing light leakage.

Furthermore, when the distance between the respective R, G, and B points is discriminated through the unit color distance of the respective R, G, and B rays of FIG. 4, FIG. 8, and FIG. 11, it turns out that the distance between the G and the B rays is the greatest with the conventional liquid crystal display, and the resulting color shifting is most serious therewith.

Therefore, as shown in FIG. 1 and FIG. 5, the upper and lower compensation films 15 and 25 are differentiated from each other in the Nz refractive index thereof, thereby improving the display characteristics.

The structure where the upper and lower compensation films 15 and 25 differ in Nz refractive index from each other such that the Nz refractive index of the upper compensation film 25 is smaller than the Nz refractive index of the lower compensation film 15 may be expressed by way of the in-plane phase retardation Ro and the thickness direction phase retardation Rth.

The in-plane phase retardation Ro of the upper compensation film 25 is greater than the in-plane phase retardation Ro of the lower compensation film 15, and the thickness direction phase retardation Rth of the upper compensation film 25 is smaller than the thickness direction phase retardation Rth of the lower compensation film 15.

That is, when the light having passed the lower polarizer 12 transmits through the lower compensation film 15, the reduction in the in-plane phase retardation Ro makes it possible to prevent the R, G, and B points from being dispersed left and right on the Poincare coordinate, while the enlargement in the thickness direction phase retardation Rth may make it possible to prevent the R, G, and B points from being dispersed up and down on the Poincare coordinate. Such a characteristic is maintained to be valid even after the light passes the liquid crystal layer. The light that has passed the liquid crystal layer is incident upon the upper compensation film 25. In order for the light that has passed the upper compensation film 25 to converge to the E point corresponding to the absorption axis of the upper polarizer 22, the upper polarizer 22 is structured such that the in-plane phase retardation Ro thereof is enlarged and the thickness direction phase retardation Rth thereof may be reduced as compared with the lower compensation film 15. Consequently, when the light passes through the liquid crystal layer, the respective R, G, and B points are not dispersed in four directions so as to decrease color shifting, and the color rays easily converge to the absorption axis of the upper polarizer 22 through the upper compensation film to decrease the leakage of light. When light leakage decreases, the black color becomes darker, and hence the contrast ratio (CR) may be improved.

The range of the Nz refractive index in forming the upper and lower compensation films 25 and 15 will now be described by way of examples below.

Figure 13:
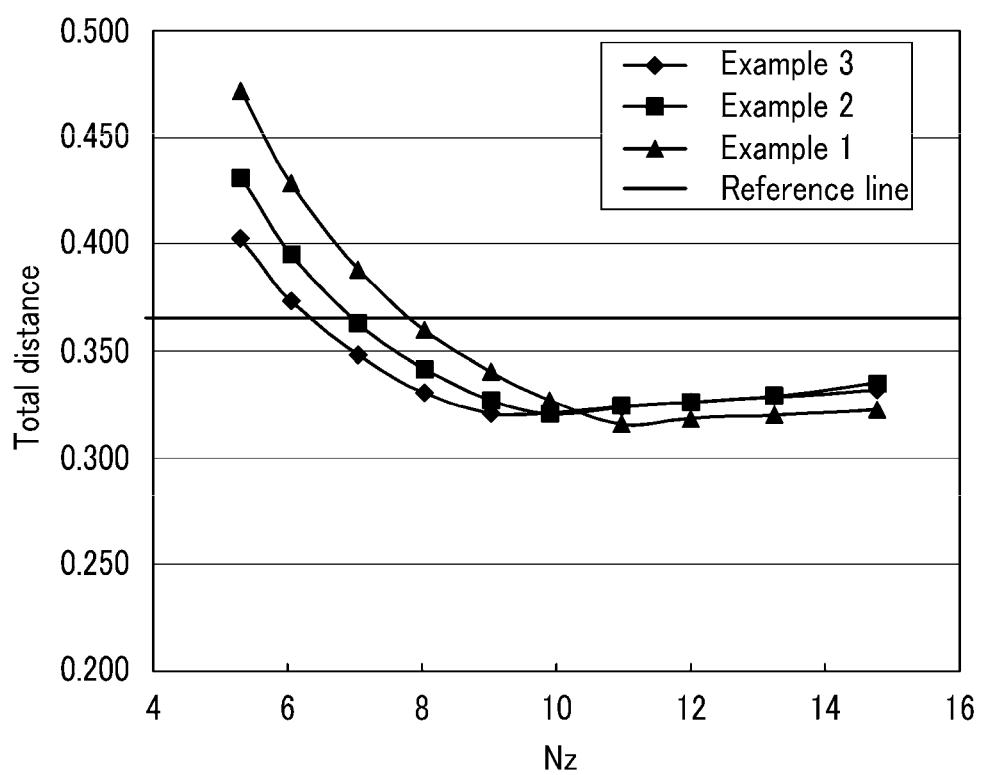
FIG. 13 is a graph showing a total distance as a function of an Nz refractive index in the examples shown in FIG. 12.

FIG. 12 shows the phase retardations Ro and Rth, the Nz refractive index, and the total distance in examples and a comparative example, and FIG. 13 is a graph showing the total distance as a function of the Nz refractive index with the examples of FIG. 12.

With each of Examples 1, 2, and 3 shown in FIG. 12, the upper compensation film 25 had a fixed Nz value, and the Nz value of the lower compensation film 15 was altered using the retardations Ro and Rth, thereby measuring the total distance.

In relation to the comparative example showing in FIG. 12, a conventional symmetrical liquid crystal display with the shortest total distance was exemplified.

With the examples shown in FIG. 12 and FIG. 13, the thickness direction phase retardation Rth of the liquid crystal is 320 nm (based on the black display state), and the panel temperature is about 50 degrees.

With Example 1, the in-plane phase retardation Ro of the upper compensation film 25 is 103 nm, the thickness direction phase retardation Rth is 82 nm, and the Nz refractive index thereof is 1.3. Thereafter, the in-plane phase retardation Ro of the lower compensation film 15, the thickness direction phase retardation Rth thereof, and the Nz refractive index thereof were altered, and the total distance thereof was measured. Compared with the total distance in the conventional liquid crystal display, the total distance where the Nz refractive index of the lower compensation film 15 was 8.04 or more turned out to be relatively short. As the conventional liquid crystal display involved the shortest total distance, it was determined that substantially improved display characteristics were obtained in Example 1 when the lower compensation film 15 had an Nz value of 6 or more.

With Example 2, the in-plane phase retardation Ro of the upper compensation film 25 is 94 nm, the thickness direction phase retardation Rth is 94 nm, and the Nz refractive index is 1.5. The total distance was measured while the in-plane phase retardation Ro, the thickness direction phase retardation Rth, and the Nz refractive index of the lower compensation film 15 varied. Compared with the total distance related to the conventional art, the total distance where the Nz refractive index of the lower compensation film 15 was 7.04 or more turned out to be relatively short. As the conventional art involved the shortest total distance, it was determined that substantially improved display characteristics were obtained in Example 2 when the Nz value of the lower compensation film 15 was 6 or more.

Furthermore, with Example 3, the in-plane phase retardation Ro of the upper compensation film 25 is 88 nm, the thickness direction phase retardation Rth is 110 nm, and the Nz refractive index is 1.76. The total distance was measured while the in-plane phase retardation Ro, the thickness direction phase retardation Rth, and the Nz refractive index of the lower compensation film 15 varied. Compared with the total distance related to the conventional art, the total distance where the Nz refractive index of the lower compensation film 15 was 7.04 or more was relatively short. As the conventional art involved the shortest total distance, it was determined that substantially improved characteristics were obtained in Example 3 when the Nz value of the lower compensation film 15 was 6 or more.

Collectively speaking, when the Nz refractive index of the upper compensation film 25 ranges from 1 to 2, the Nz refractive index of the lower compensation film 15 is preferably established to be 6 or more. However, when the Nz refractive index exceeds 30, the in-plane phase retardation Ro comes to have an excessively small value, possibly incurring processing problems. Accordingly, the Nz refractive index of the lower compensation film 15 may range from 6 to 30.

With the examples shown in FIG. 12 and FIG. 13, measurements were made when the thickness direction phase retardation Rth of the liquid crystal was 320 nm. Referring to FIG. 12, as the thickness direction phase retardation Rth of the vertically-aligned liquid crystal ranges from 260 nm to 340 nm, the upper and lower limits in the range of FIG. 12 may be enlarged. In this connection, the thickness direction phase retardation Rth of the upper compensation film 25 may range from 80 to 115, and the in-plane phase retardation Ro may range from 80 to 110. Furthermore, the thickness direction phase retardation Rth of the lower compensation film 15 may range from 130 to 155, and the in-plane phase retardation Ro may range from 5 to 35.

Meanwhile, the sum of the thickness direction phase retardation Rth of the upper and lower compensation films 25 and 15 may range from 200 nm to 300 nm, and the sum of the in-plane phase retardation Ro of the upper and lower compensation films 25 and 15 may range from 80 nm to 150 nm. When the sum of the thickness direction phase retardation Rth and the sum of the in-plane phase retardation Ro of the compensation films 15 and 25 are examined based on the thickness direction retardation Rth of the liquid crystal layer, the sum of the thickness direction phase retardation Rth of the lower and upper compensation films 15 and 25 is in the range of 0.6 to 0.94 times the thickness direction phase retardation Rth of the liquid crystal layer, and the sum of the in-plane phase retardation Ro thereof is in the range of 0.25 to 0.5 times the thickness direction phase retardation Rth of the liquid crystal layer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a liquid crystal panel comprising a vertically-aligned liquid crystal layer;
a first compensation film attached to a surface of a first substrate of the liquid crystal panel, the first substrate comprising a thin film transistor;
a first polarizer attached to an outer surface of the first compensation film;
a second compensation film attached to a surface of a second substrate facing the first substrate; and
a second polarizer attached to an outer surface of the second compensation film,
wherein
a thickness direction phase retardation Rth of the first compensation film is greater than a thickness direction phase retardation Rth of the second compensation film, and
wherein the in-plane phase retardation Ro of the first compensation film is smaller than the in-plane phase retardation Ro of the second compensation film.

2. The liquid crystal display of claim 1, wherein the first polarizer and the second polarizer each have an absorption axis, and the absorption axes of the first polarizer and the second polarizer are perpendicular to each other.

3. The liquid crystal display of claim 2, wherein the first compensation film and the second compensation film each have a slow axis, and the slow axis of the first compensation film is perpendicular to the absorption axis of the first polarizer, and the slow axis of the second compensation film is perpendicular to the absorption axis of the second polarizer.

4. The liquid crystal display of claim 2, wherein the first compensation film and the second compensation film each have a slow axis, and the slow axis of the first compensation film is parallel to the absorption axis of the first polarizer, and the slow axis of the second compensation film is perpendicular to the absorption axis of the second polarizer.

5. The liquid crystal display of claim 4, wherein the first compensation film and the second compensation film each have a thickness direction phase retardation Rth and an in-plane phase retardation Ro, and the first compensation film and the second compensation film are differentiated from each other both in the in-plane phase retardation Ro and the thickness direction phase retardation Rth thereof.

6. The liquid crystal display of claim 5, wherein the in-plane phase retardation Ro of the first compensation film is smaller than the in-plane phase retardation Ro of the second compensation film.

7. The liquid crystal display of claim 1,
wherein the first compensation film and the second compensation film have refractive indices nx, ny, and nz in the x, y, and z directions, respectively,
wherein the refractive indices nx and ny in the in-plane x and y axis directions are greater than the refractive index nz in the z axis direction vertical thereto, and
wherein the refractive index nx is greater than the refractive index ny, and wherein if a side of light incidence upon the liquid crystal display is assumed to be a second side, the nz refractive index of the first compensation film is greater than the nz refractive index of the second compensation film.

8. The liquid crystal display of claim 7, wherein the nz refractive index of the second compensation film ranges from 1 to 2.

9. The liquid crystal display of claim 8, wherein the nz refractive index of the first compensation film ranges from 6 to 30.

10. The liquid crystal display of claim 9, wherein a thickness direction phase retardation Rth of the liquid crystal layer ranges from 260 nm to 340 nm when the liquid crystal display is vertically aligned.

11. The liquid crystal display of claim 1, wherein a thickness direction phase retardation Rth of the liquid crystal layer ranges from 260 nm to 340 nm.

12. The liquid crystal display of claim 11, wherein the thickness direction phase retardation Rth of the second compensation film ranges from 80 nm to 115 nm, and the in-plane phase retardation Ro of the second compensation film ranges from 80 nm to 110 nm.

13. The liquid crystal display of claim 12, wherein the thickness direction phase retardation Rth of the first compensation film ranges from 130 nm to 155 nm, and the in-plane phase retardation Ro of the first compensation film ranges from 5 nm to 35 nm.

14. The liquid crystal display of claim 11, wherein the sum of the thickness direction phase retardation Rth of the first compensation film and the second compensation film is ranges from 0.6 to 0.94 times the thickness direction phase retardation Rth of the liquid crystal layer.

15. The liquid crystal display of claim 14, wherein the sum of the in-plane phase retardation Ro of the first compensation film and the second compensation film is in the range of 0.25 to 0.5 times the thickness direction phase retardation Rth of the liquid crystal layer.

16. A method for manufacturing a liquid crystal display, comprising:
preparing a liquid crystal panel with a vertically-aligned liquid crystal layer;
attaching a first compensation film to a surface of a first substrate of the liquid crystal panel, the first substrate comprising a thin film transistor;
attaching a first polarizer to an outer surface of the first compensation film;
attaching a second compensation film to a surface of a second substrate facing the first substrate; and
attaching a second polarizer to an outer surface of the second compensation film,
wherein a thickness direction phase retardation Rth of the first compensation film is greater than a thickness direction phase retardation Rth of the second compensation film, and
wherein an in-plane phase retardation Ro of the first compensation film is smaller than an in-plane phase retardation Ro of the second compensation film.

17. The method of claim 16, wherein the first polarizer and the second polarizer each have an absorption axis, and the absorption axes of the first polarizer and the second polarizer are perpendicular to each other.

18. The method of claim 17, wherein the first compensation film and the second compensation film each have a slow axis, and the slow axis of the first compensation film is parallel to the absorption axis of the first polarizer, and the slow axis of the second compensation film is perpendicular to the absorption axis of the second polarizer.

19. The method of claim 18, wherein the first compensation film and the second compensation film each have a thickness direction phase retardation Rth and an in-plane phase retardation Ro, and the first compensation film and the second compensation film are differentiated from each other both in the in-plane phase retardation Ro and the thickness direction phase retardation Rth thereof.

20. The method of claim 19, wherein the in-plane phase retardation Ro of the first compensation film is smaller than the in-plane phase retardation Ro of the second compensation film.

21. The method of claim 17, wherein the first compensation film and the second compensation film each have a slow axis, and the slow axis of the first compensation film is perpendicular to the absorption axis of the first polarizer, and the slow axis of the second compensation film is perpendicular to the absorption axis of the second polarizer.

22. The method of claim 16,
wherein the first compensation film and the second compensation film have refractive indices nx, ny, and nz in the x, y, and z directions, respectively,
wherein the refractive indices nx and ny in the in-plane x and y axis directions are greater than the refractive index nz in the z axis direction vertical thereto, and
wherein the refractive index nx is greater than the refractive index ny, and
wherein if a side of light incidence upon the liquid crystal display is assumed to be a second side, the nz refractive index of the first compensation film is greater than the nz refractive index of the second compensation film.

23. The method of claim 22, wherein the nz refractive index of the second compensation film ranges from 1 to 2.

24. The method of claim 23, wherein the nz refractive index of the first compensation film ranges from 6 to 30.

25. The method of claim 24, wherein if the liquid crystal layer is vertically aligned, the thickness direction phase retardation Rth of the liquid crystal layer ranges from 260 nm to 340 nm.

26. The method of claim 16, wherein a thickness direction phase retardation Rth of the liquid crystal layer ranges from 260 nm to 340 nm.

27. The method of claim 26, wherein the thickness direction phase retardation Rth of the second compensation film ranges from 100 nm to 120 nm, and the in-plane phase retardation Ro of the second compensation film ranges from 80 nm to 100 nm.

28. The method of claim 27, wherein the thickness direction phase retardation Rth of the first compensation film ranges from 125 nm to 160 nm, and the in-plane phase retardation Ro of the first compensation film ranges from 5 nm to 20 nm.

29. The method of claim 26, wherein the sum of the thickness direction phase retardation Rth of the first compensation film and the second compensation film ranges from 0.6 to 0.94 times the thickness direction phase retardation Rth of the liquid crystal layer.

30. The method of claim 29, wherein the sum of the in-plane phase retardation Ro of the first compensation film and the second compensation film is in the range of 0.25 to 0.5 times the thickness direction phase retardation Rth of the liquid crystal layer.

* * * * *